Patented Sept. 16, 1930

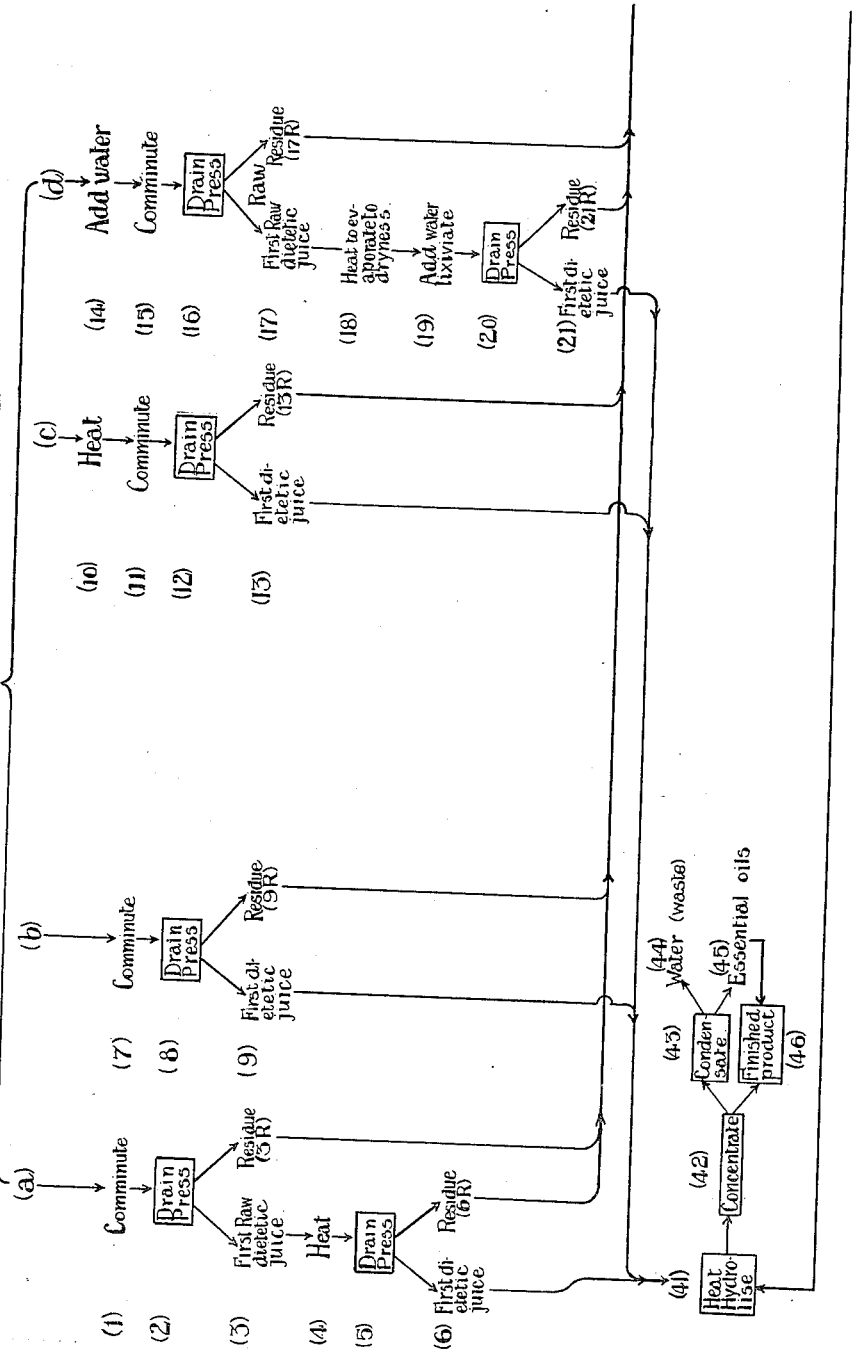

1,775,967

UNITED STATES PATENT OFFICE

EUSTACE HAMILTON MILES, OF LONDON, AND GERARD REILLY, OF LUTON, ENGLAND

PROCESS OF MAKING A VEGETABLE FOOD    REISSUED

Application filed July 8, 1926, Serial No. 121,230, and in Great Britain July 15, 1925.

This invention relates to a new concentrated vegetable food composition and the process of making the same.

One of the objects of our invention is to produce a highly concentrated vegetable food composition made from selected classes of vegetables in certain proportions, which is of a pleasant flavour, free from bitterness or other unpleasant taste, which contains undeteriorated the greater part of the vitamins, natural plant salts in their organic combination, essential oils and other food elements of the vegetables (much of which is lost in ordinary cooking) so combined as to be easy of digestion, and having the said food elements combined in such proportions and in such a way as to form a curative food suitable for the maintenance of health and prevention of disease and which also will remain good and edible for many months even though exposed to the air, without the addition of any preservative whatever, and without subjection to great heat as in cooking or canning, and which can be packed and transported without risk of deterioration. Some products of our process have remained good and edible though exposed to the air for more than two years.

Hitherto in order to delay or prevent decay or deterioration of food products, it has been found necessary to subject them to a high temperature as in ordinary cooking and/or to prolonged heating, as boiling or baking and/or also to add thereto some preservative, such as ordinary refined (and therefore devitalized) sugar, table salt, boric acid or formaldehyde. Such sugar sometimes crystallizes when the food is exposed to the air and also is irritating to the stomach, and is difficult of digestion by certain persons. Salt is well known to the medical profession to have a deleterious effect on the blood pressure of certain persons. Boric acid is also well known to be deleterious to health, as is formaldehyde.

By our process the use of such high temperatures and such added preservatives is avoided entirely and the product preserved from decay or deterioration in part by the use of the juice of vegetables containing saccharine material. This juice is subjected to hydrolyzation (together with the juices of the other vegetables treated) which hydrolyzes the saccharoses and crystallization is avoided, while at the same time the vitamins, natural plant salts and other valuable food elements in the juices (which are absent from refined sugar) are retained and so the food value of the product is increased.

The high concentration of the natural plant salts, vitamins and oils of the vegetables themselves also acts as a preservative, preventing decay or deterioration.

Our product is characterized by a distinctive pleasant flavour partaking partly of the combined flavour of the different vegetables used, also by the absence of all bitterness or unpleasant flavours which exist in the vegetables themselves, or are developed by comminuting the vegetables or otherwise during the process; which unpleasant flavours are eliminated by the alternating of the different steps of our process. The characteristic flavour of our product is also created partly by caramelization, at the stages of our process indicated hereafter, and an agreeable colour is also thereby created which is useful in making a saleable product.

High temperatures such as are used in ordinary cooking destroy some of these pleasant flavours, and also destroy or render less capable of assimilation some of the vitamins, natural plant salts, essential oils and other valuable food elements. These are retained undeteriorated by our process in which the temperatures employed and the duration of their employment are considerably less than those used in ordinary cooking of vegetables. This results also in great economy of fuel and heat.

We produce this composition by a new process (hereafter more particularly described) which consists in selecting vegetables of the types and classes and in about the proportions hereafter described, some of which vegetables contain about 1% or less of saccharine material and some which contain about 3% to 15% of such material, (said proportions being suitable, but our invention is not limited to the same) extracting their juices cold, separately, by dividing or comminuting them, then draining and pressing away the juices (reserving the residues for treatment by suitable edible acid juice, preferably in organic or non-devitalized form, but any suitable edible mineral acid may be employed to render soluble and extract the insoluble phosphates, and to extract the calcium, magnesium and other natural plant salts in their organic or non-devitalized form therefrom to make the acid extract), heating the vegetables or the juices at certain stages of the process and at temperatures hereafter described, collecting together the said juices, adding thereto the said acid extract, hydrolyzing the saccharoses therein, then concentrating the product by evaporating the same in vacuo, which separates the essential oils, then adding the said oils to said concentrate which constitutes the finished product.

A portion of said residues may also be ground fine and added to the said concentrate so as to use the natural plant salts remaining in them, to increase the food value of the product.

A certain class of said vegetables which are of a dry character, such as beans, are treated separately (as hereafter more fully described) and the juice from them is procured by adding water, soaking and comminuting, this juice is then caramelized by heating to produce colour and an improved flavour. Certain vegetables which contain essential oils of an unpleasant flavour are treated separately and concentrated in vacuo separately as aforesaid, and the concentrate added to the finished product, while the said oils extracted by heating are thrown away.

Hydrolyzation in our process differs from that ordinarily employed by chemists viz— by heating a substance with crude acid or alkali, which is not suitable for a food product.

One of the parts of our process which we claim as new, is such hydrolyzation in such a living (non-devitalized) solution, by living plant salts and acids at a temperature that does not devitalize them or the product. The hydrolyzation is done by the acid of the vegetables used for the extraction of the insoluble phosphates, and by the calcium and magnesium salts extracted by said acid and by the salts of the other juices so mixed. These elements all coact in the process.

Another essential feature of our process which is new, is that the insoluble phosphates in the vegetables are rendered soluble by the use of a non-devitalized vegetable acid juice in the treatment of said residues, (instead of mineral acid) and said phosphates are removed from the fibre of said residues in such form as to be assimilable by the human system in which they are of great value as food for the brain, nerves and bones. The use of mineral acid destroys this assimilability.

In our process another essential feature which is new, is that we employ the fresh juices of vegetables, containing acid in large proportions, as they exist in the plant, instead of using inorganic acid, to render soluble and extract the insoluble natural plant salts retained by the fibres or pulp including the phosphates of calcium and magnesium, iron manganese, etc., from the said residues.

This extraction is thus effected without destroying the vitalistic connection between the purely mineral part and the organic part of said natural plant salts. In other words it avoids devitalization of said salts. The use of mineral acids to effect the extraction of said salts would have the effect of devitalizing the said salts.

The avoidance by our process of devitalization of the natural plant salts is an essential feature of the process and is new. By "natural plant salts" or "natural salts" is meant the complex substances resulting from the vital action of the growth of plants in which the metallic salts (e. g. calcium phosphate) are in combination with organic substances (in which form they are directly assimilable in the process of digestion which is not the case with ordinary pure chemical salts).

The result of our process is a new and improved food product more beneficial to health, which contains, in a greater quantity and in a more concentrated and more assimilable form than in other known food products the metallic salts in organic combination (the natural plant salts) and vitamins of the vegetables themselves; and a special characteristic of this food is that it keeps edible for many months though exposed to the air.

Our product is more useful and also of improved efficacy as a food in (and a preventive of) those states of ill-health which are due to deficiency of the natural salts and vitamins and can be prepared to contain special proportions (by selecting for the process vegetables containing them) of those metallic plant salts which have good effects in cases of disease; for example (but not limiting it to use in such diseases) of sodium for acidosis in general; of potassium for cancer; of iron, for anæmia; of calcium, for defective digestion of albumen, for too free bleeding, for deficiencies of teeth and bone, and of tone to the bowels. It is an aid in constipation. Magnesium also aids in cases of constipation and deficient bowel tone.

For this purpose vegetables may be selected for use in our process which contain such salts in a high degree normally and/or by reason of being grown on soils which produce in them an excess of such salts. The selection of such vegetables and the quantity of them to be used in the process may be left to the choice of the dietetist or chemist desiring to prepare such special food by our process for use in the case of those suffering from one or other of such diseases.

Our invention includes the several steps described and the relation and order of one or more of the said steps with respect to each of the other steps, and also includes the product resulting therefrom.

It is intended that the description herein given is to be taken as illustrative and not in a limiting sense, as many changes can be made in carrying out our process without departing from the scope of our invention.

We produce the said food composition in the following manner, which can be more easily understood by reference to the accompanying table, as the process is somewhat complex.

The vegetable food materials to be used in this composition are divided into three main classes. I. Vegetable food materials containing about 1% or less of saccharine material. II. Vegetable food materials which contain about 3% to 15% or more of saccharine material. III. Vegetable food materials containing acids in large proportion.

Class I is divided into four sub-classes needing different treatment on account of the different properties of the different vegetables.

*Sub-class (a)*—Vegetable food material from the raw juice of which undesirable properties such as bitter or nauseous flavours, characteristic of the vegetable itself can be removed by heating and straining as described. (Type spinach, lettuce, cabbage, water-cress etc. . . .)

*Sub-class (b)*—Vegetable food material the raw juice of which does not contain such undesirable properties and therefore require no such heating. (Type celery.)

*Sub-class (c)*—Vegetable food material which develops undesirable properties such as bitter flavours when the cell structure is ruptured by comminution. (Type onions.)

*Sub-class (d)*—Dry or partly dry vegetable food material such as seed vegetables. (Type beans.)

To make the said food composition or product the actual vegetables of either class or sub-class may consist of one sort only of that class or more than one.

The following is a formula giving the types and approximate quantities of vegetable food material found to be suitable to be used in our process, but our invention is not limited to said quantities.

TYPE OF FORMULA

| | | | Pounds |
|---|---|---|---|
| Class I | Sub-class (a) | Lettuce | 5 |
| | | Cabbage | 1 |
| | | Water-cress | 5 |
| | Sub-class (b) | Celery | 30 |
| | Sub-class (c) | Onions | 15 |
| | Sub-class (d) | Beans | 2 |
| | | Bran | 2 |
| Class II | | Carrot | 25 |
| | | Beet root | 5 |
| Class III | | Acid | 10 |
| | | Material | |
| | | Tomato | |
| | | | 100 |

If it is desired to have a product containing more or less potash, soda, lime, magnesium, iron, or other salts suitable for persons suffering from certain ailments such as acidosis, rheumatism, gout, anæmia, etc. . . ., vegetables which contain more or less of said salts can be selected for the treatment under our process.

All the said vegetable materials are to be taken in their raw state, thoroughly cleaned and all refuse and decay removed. All the materials of the vessel, etc., which come into contact with the product in any stage of the process, must be such that no deleterious action takes place.

The material of Class I sub-class (a) is divided and comminuted (1) (see table) and the resulting pulp drained and pressed (2) to remove as much as possible of the vegetable juice (3), the residue is (3R) reserved for treatment by the acid material hereafter described (34) to (40). The juice (3) is heated (4) to 80° C., keeping it at said temperature until coagulation takes place, and the coagulum which forms is strained off and drained and pressed (5), leaving a small residue (6R) which may be rejected as waste. This juice (3) is heated at (4) because in the case of certain vegetables of this sub-class (a) the raw juice has a harsh and bitter taste characteristic of the vegetable itself, which is removed or reduced with the coagulum when the latter is strained off, and thereby the flavour of the juice is improved. The juice (6) is then, with other juices subjected to the hydrolyzing process (41) as referred to hereafter.

The materials of Class I, sub-class (b), are treated in a precisely similar manner to those of sub-class (a) except that the juice (9) is not heated because it does not contain bitter or unpleasant flavours and is simply strained to remove any solids accidentally present. This juice (9) is reserved for further treatment with the juices and extracts by hydrolyzation and by the several steps of the process following thereon, to and including (46) the end thereof, referred to hereafter. The residue (9R) is also reserved for the same treatment as the residues at (34) to (40) (inclusive) referred to hereafter.

The materials of Class I, sub-class (c), are used whole when not more than about 3/4 of an inch thick in the thickest parts, otherwise they are sliced or divided to reduce them to about that size, and immediately heated (10) by being plunged into boiling water or steamed until the whole reaches a temperature of about 80° C.: they are heated before being comminuted because we have found that heating prevents the formation of undesirable properties (i. e. bitter or unpleasant flavours, e. g. in the case of onions) which are otherwise formed by the mixing of the cell contents when the vegetable matter of this sub-class is comminuted without being first heated. The size specified is simply convenient in allowing the heat to penetrate right through the vegetable without delay. This material as stated is heated (10) until the whole has reached a temperature of about 80° C., when the heating is stopped (as prolonged heating would produce a slimy substance more difficult to work) and the material is further divided or comminuted (11) and the pulp drained and pressed (12) as in sub-class (a) (2). The juice (13) is reserved for further treatment with the juices and extracts by hydrolyzation and by the several steps of the process following thereon, to and including (46), the end thereof, referred to hereafter. The residue (13R) is reserved for the same treatment as the residues at (34) to (40) (inclusive) referred to hereafter.

The materials of class I sub-class (d) being dry, or partly dried, are treated with water and soaked (14), divided or comminuted (15), if not already small, then drained and pressed (16) and the juice or liquor (17) is obtained. The residue (17R) is reserved for the same treatment as the residues at (34) to (40) (inclusive) referred to hereafter. This juice or liquor is evaporated to dryness (18) by heating in shallow pans over the water bath, and the dried residue is heated in like manner still on the water bath, until it develops a faint orange-brown colour and at the same time an appetizing flavour, by the slight dehydration or caramelization of some of the constituents of the said residue. This dried and heated residue is then lixiviated (19) with water in small quantity to dissolve the soluble constituents and is then strained and pressed (20) and this liquor forms the juice (21) obtained from materials of sub-class (b). This juice (21) is reserved for further treatment with the juices and extracts by hydrolyzation and by the several steps of the process following thereon, to and including (46), the end thereof, referred to hereafter. The residue (21R) is rejected as waste.

The juice (17), after being heated (18) is thick like cream (owing to the coagulation of the proteids present) and in this state the soluble portions of it cannot be easily separated. It is therefore necessary to evaporate it to dryness, which causes the proteids to be condensed into a small bulk which enable the separation to be easily effected by lixiviation.

The heating also effects at the same time the caramelization and develops the appetizing flavour, and produces a change of colour which indicates that chemical action has taken place.

The treatment (22) to (27) of the materials of Class II containing the saccharine constituents is identical with that described above for the materials of Class I, sub-class (a), from (1) to (6) (inclusive) of the process (see table). The juice (27) is reserved for further treatment with the juices and extracts by hydrolyzation and by the several steps of the process following thereon, to and including (46), the end thereof, referred to hereafter.

The residue (24R) is reserved for the same treatment as the residues at (34) to (40) (inclusive) of the process referred to hereafter. The residue (27R) is rejected as waste.

The acid material of Class III is obtained (29) to (33) from tomatoes or other suitable acid vegetable food material, by subjecting it to the process described above for Class I, sub-class (a), from (1) to (6) (inclusive of the process). The final juice or material (33) so obtained is diluted with water (33') till the acidity is reduced to 0.035% to make the acid liquid to be used for spraying the residues at (35). Instead of this acid material of vegetable origin, we may use any suitable mineral acids diluted until the acidity is reduced to about 0.035% as above, but we perfer to use said organic acid from vegetable food material, as inorganic acid has a tendency to devitalize the natural plant salts and renders the product less valuable as a food.

The residues obtained from materials of Class I and Class II will have different values as sources of calcium and megnesium, largely on account of the kind of soil the vegetables are grown upon. The residues containing the most calcium and/or magnesium salts are selected for treatment by the acid liquid either by chemical test or roughly by inspection of the ash. The residues selected are collected together (34) and broken up fine (35) so that they can be readily penetrated by the said acid liquid. This acid liquid is sprayed over the said residues forming a mass which is stirred and kneaded to secure mixture and the action is allowed to go on for about an hour at a temperature not exceeding 75° C., when the mass is drained and pressed again (36) to separate the liquid (37) from the residue (37R). The residue (37R) is then again treated in a similar way by adding water and mixing (38) and draining and pressing (39) will secure further valuable juice (40). The final residue (40R) is waste. Selected portions of other residues, which have not been treated by acid, may if desired be ground fine and added to the concentrated product (42) to use the natural plant salts still remaining therein.

Five juices (6), (9), (13), (21) and (27) have now been described, and in addition there are the juices (37) and (40) which are acid extracts from the treatments (35) and (38) just described. All of these juices (except such are as known to contain or by experiment are found to contain essential oils of an unpleasant flavour) are collected together (being intimately combined in solution) in one vessel and heated to about 75° C. (41) till hydrolyzation of the saccharoses is well advanced. The liquid is then cooled to about 30° C., and passed on to the vacuum evaporator and there evaporated in vacuo and concentrated (42) until a viscous mass is formed. There remains in the evaporator said viscous mass or concentrated product which is removed into a suitable receptacle. The hydrolyzation is completed in the early stages of the concentration in the vacuum evaporator (42).

The vapours from the said evaporator are conveyed to a condenser and there condensed by cooling (43) and the essential oils contained therein extracted (45) by settlement or by a centrifuge. By experimenting it has been found that certain of the juices contain oils that are of an unpleasant flavour (e. g. celery). These juices are hydrolyzed at (41), then concentrated in vacuo at (42) and the condensate (43) containing the unpleasant oils is run to waste and not used. The concentrate (42) is mixed with the final product (46).

Those essential oils of a pleasant flavour which have been extracted at (45) are retained and mixed with product in the receptacle (46) in order to utilize their flavouring and preservative properties. This forms our finished product which is ready to be placed in containers for sale.

The final composition or product is a semi-solid or viscous mass. It is plastic, not elastic like jelly. The specific gravity is about 1.5. The odour is aromatic and appetizing. The colour is a deep brown, slightly reddish. The taste is compounded partly of the characteristic flavours of the vegetables used, with something added due to the caramelization of those constituents which are sensitive to the low temperature employed. It is piquant with the slight acidity of the acid juice. When diluted with water it forms an appetizing soup. The water content is about 30%. The ash content is about 10%. The organic part consists largely of sugars and other carbohydrates, and also proteids and extractives.

However, the product cannot be properly described otherwise than by reference to the process above set out.

In our present application for patent we desire to claim one specific form of our new food and the process of making it; in an application of even date herewith we claim our new food and the process of making it broadly and generically.

What we claim and desire to secure by Letters Patent is:

1. The process of making a concentrated vegetable food composition consisting in extracting the natural juices from edible vegetables which contain about 1% or less of saccharine material; extracting separately the natural juices from edible vegetables which contain about 3% to 15% of saccharine material; extracting with a vegetable acid the natural plant salts from the residues of said vegetables; intimately combining in a suitable vessel all juices thus extracted, acids and natural plant salts; heating the mixture until hydrolyzation of the sucrose therein is well advanced; and concentrating the mass in vacuo.

2. In the process set forth in claim 1, rendering soluble and extracting the natural plant salts from the residues of the vegetables which remain after the natural juices have been extracted by means of the natural juices from a vegetable food material containing acid.

3. The process of making a concentrated vegetable food composition consisting in extracting the natural juices from edible vegetables which contain about 1% or less of saccharine material; extracting separately the natural juices from edible vegetables which contain about 3% to 15% of saccharine material; extracting with a vegetable acid the natural plant salts from the residues of said vegetables; intimately combining in a suitable vessel all juices thus extracted, acids and natural plant salts; heating for a moderate time at a moderate temperature the mixture until hydrolyzation of the sucrose therein is well advanced; and concentrating the mass in vacuo.

4. The process of making a concentrated vegetable food composition consisting in extracting the natural juices from edible vegetables which contain about 1% or less of saccharine material; extracting separately the natural juices from edible vegetables which contain about 3% to 15% of saccharine material; extracting with a vegetable acid the natural plant salts from the residues of said vegetables; intimately combining in a suitable vessel all juices thus extracted, acids and natural plant salts; heating for a moderate time at a moderate temperature the mixture until hydrolyzation of the sucrose therein is well advanced; and concentrating the mass in vacuo, the temperature at no time exceeding in the neighborhood of 80° C.

5. The process of making a concentrated vegetable food composition consisting in extracting the natural juices from edible vegetables which contain about 1% or less of saccharine material; extracting separately the natural juices from edible vegetables which contain about 3% to 15% of saccharine material; extracting with a vegetable acid the natural plant salts from the residues of said vegetables; intimately combining in a suitable vessel all juices thus extracted, acids and natural plant salts; heating the mixture until hydrolyzation of the sucrose therein is well advanced; and concentrating the mass in vacuo, condensing the vapors therefrom; separating the resultant oils; and adding said oils to the said mixture.

In testimony whereof, we affix our signatures.

EUSTACE HAMILTON MILES.
GERARD REILLY.